(12) United States Patent
Langhammer

(10) Patent No.: US 10,649,731 B2
(45) Date of Patent: *May 12, 2020

(54) INTEGRATED CIRCUITS WITH SPECIALIZED PROCESSING BLOCKS FOR PERFORMING FLOATING-POINT FAST FOURIER TRANSFORMS AND COMPLEX MULTIPLICATION

(71) Applicant: Altera Corporation, San Jose, CA (US)

(72) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,667

(22) Filed: Oct. 23, 2018

(65) Prior Publication Data

US 2019/0121614 A1     Apr. 25, 2019

Related U.S. Application Data

(63) Continuation of application No. 15/277,955, filed on Sep. 27, 2016, now Pat. No. 10,140,091.

(51) Int. Cl.
  *G06F 17/14* (2006.01)
  *G06F 7/483* (2006.01)
  *G06F 7/48* (2006.01)
  *G06F 7/544* (2006.01)

(52) U.S. Cl.
  CPC ............ *G06F 7/483* (2013.01); *G06F 7/4812* (2013.01); *G06F 7/5443* (2013.01); *G06F 17/142* (2013.01); *G06F 2207/4812* (2013.01)

(58) Field of Classification Search
  None
  See application file for complete search history.

(56) References Cited

U.S. PATENT DOCUMENTS

| 7,567,997 B2 | 7/2009 | Simkins et al. | |
| 8,041,759 B1 * | 10/2011 | Langhammer | ....... H03K 19/177 326/38 |
| 8,266,198 B2 | 9/2012 | Lee et al. | |

(Continued)

OTHER PUBLICATIONS

Langhammer, U.S. App. No. 14/880,633, filed Oct. 12, 2015.

*Primary Examiner* — David H Malzahn
(74) *Attorney, Agent, or Firm* — Treyz Law Group, P.C.; Jason Tsai

(57) ABSTRACT

Integrated circuits with specialized processing blocks are provided. A specialized processing block may include one real addition stage and one real multiplier stage. The multiplier stage may simultaneously feed its output to the addition stage and directly to an adjacent specialized processing block. The addition stage may also produce sum and difference outputs in parallel. A group of four such specialized processing blocks may be connected in a chain to implement a radix-2 fast Fourier transform (FFT) butterfly. Multiple radix-2 butterflies may be stacked to form yet higher order radix butterflies. If desired, the specialized processing block may also be used to implement a complex multiply operation. Three or four specialized processing blocks may be chained together and along with one or more adders outside the specialized processing blocks, real and imaginary portions of a complex product can be generated.

15 Claims, 8 Drawing Sheets

(56) References Cited

U.S. PATENT DOCUMENTS

| | | |
|---|---|---|
| 8,266,199 B2 | 9/2012 | Langhammer et al. |
| 8,301,681 B1 | 10/2012 | Lee et al. |
| 8,307,023 B1 | 11/2012 | Leung et al. |
| 8,543,634 B1 * | 9/2013 | Xu .................. G06F 7/552 |
| | | 326/41 |
| 9,207,908 B1 | 12/2015 | Langhammer |
| 10,140,091 B2 * | 11/2018 | Langhammer .......... G06F 7/483 |
| 2010/0191786 A1 | 7/2010 | Simkins et al. |
| 2012/0016923 A1 | 1/2012 | Wen et al. |
| 2012/0290819 A1 | 11/2012 | Langhammer |
| 2017/0115958 A1 * | 4/2017 | Langhammer .......... G06F 7/523 |
| 2018/0088906 A1 * | 3/2018 | Langhammer .......... G06F 7/483 |

* cited by examiner

INTEGRATED CIRCUITS WITH SPECIALIZED PROCESSING BLOCKS FOR PERFORMING FLOATING-POINT FAST FOURIER TRANSFORMS AND COMPLEX MULTIPLICATION

This application is a continuation of U.S. patent application Ser. No. 15/277,955, filed Sep. 27, 2016, which is hereby incorporated by reference herein in its entirety. This application claims the benefit of and claims priority to U.S. patent application Ser. No. 15/277,955, filed Sep. 27, 2016.

BACKGROUND

This invention relates generally to integrated circuit and, in particular, to integrated circuits with floating-point arithmetic circuitry.

Programmable logic devices (PLDs) include logic circuitry such as look up tables (LUTs) and sum-of-product based logic that are designed to allow a user to customize the circuitry to the user's particular needs. This configurable logic is typically divided into individual logic circuits that are referred to as logic elements (LEs). The LEs may be grouped together to form larger logic blocks referred to as logic array blocks (LABS) that may be configured to share the same resources (e.g., registers and memory). In addition to this configurable logic, PLDs also include programmable interconnect or routing circuitry that is used to connect the inputs and outputs of the LEs and LABs. The combination of this programmable logic and routing circuitry is referred to as soft logic.

Besides soft logic, PLDs may also include specialized processing blocks that implement specific predefined logic functions and thus cannot be configured by the user. Such specialized processing blocks may include a concentration of circuitry on a PLD that has been partly or fully hardwired to perform one or more specific tasks, such as a logical or a mathematical operation. Examples of structures that are commonly implemented in such specialized processing blocks include: adders, multipliers, arithmetic logic units (ALUs), barrel-shifters, various memory elements (such as FIFO/LIFO/SIPO/RAM/ROM/CAM blocks and register files), logic AND/NAND/OR/NOR arrays, etc., or combinations thereof.

One particularly useful type of specialized processing block that has been provided on PLDs is a digital signal processing (DSP) block. A common application for the DSP block is to support fast Fourier transform (FFT) and similar arithmetic operations. For example, the Cooley-Tukey FFT algorithm involves recursively breaking down the FFT operation into smaller discrete Fourier transforms (DFTs), which can then be combined using a "butterfly" computation. In the radix-2 case, where the operation receives two complex inputs and is broken down into two smaller sub-transforms, the butterfly computation requires six real addition type operations and four real multiplication operations (i.e., e ratio of addition to multiplication is 1.5). A conventional DSP block, however, includes only one multiplier and only one adder (i.e., the ratio of multipliers to adders is 1:1). As a result, the conventional DSP block is not optimized to performed FFT operations It is within this context that the embodiments described herein arise.

SUMMARY

This relates generally to integrated circuits and, more particularly, to programmable integrated circuits that include specialized processing blocks. The specialized processing blocks may be at least partially hardwired blocks for supporting complex arithmetic operations and are sometimes referred to as digital signal processing (DSP) blocks.

In accordance with an embodiment, each DSP block may include a first input port for receiving a first input signal, a second input port for receiving a second input signal, a third input port for receiving a third input signal, a fourth input port for receiving a fourth input signal from a preceding adjacent DSP block in arrangements where multiple DSP blocks are connected in a chain, a multiplier circuit, an adder circuit, and first, second, and third outputs. The adder circuit may be a hybrid adder that can generate in parallel both a sum signal at the first output of the DSP block and a difference signal at the second output of the DSP block. The multiplier may receive the first and second inputs from the first and second input ports and may generate a corresponding product signal.

The DSP block may further include first, second, and third routing multiplexers. The first routing multiplexer may have a first input that receives the product signal from the multiplier, a second input that receives the third input signal, a third input that receives the second input signal via a bypass path, a fourth input that receives the fourth input signal, and an output that feeds into the adder circuit. The second routing multiplexer may have a first input that receives the third input signal, a second input that receives fourth input signal, a third input that is coupled to the first output of the DSP block, and an output that also feeds into the adder circuit. The third routing multiplexer may have a first input that receives the product signal directly from the multiplier, a second input that receives the third input signal, a third input that is coupled to the first output of the DSP block via a feedback path, and an output that serves as the third output of the DSP block. The third output of the DSP block may be directly connected to a succeeding adjacent DSP block in arrangements where multiple DSP blocks are connected in a chain.

In one suitable arrangement, four DSP blocks may be connected in a chain to implement radix-2 fast Fourier transform (FFT) circuitry. The four DSP blocks may receive a first complex input X (which includes a real component Xreal and an imaginary component Ximag), a second complex input Y (which includes a real component Yreal and an imaginary component Yimag), and a complex twiddle factor W (which includes a real component Wreal and an imaginary component Wimag) and output corresponding complex butterfly top and bottom signals. In particular, the first and third DSP blocks in the chain may output the complex butterfly top signals, whereas the second and fourth DSP blocks in the chain may output the complex butterfly bottom signals for the radix-2 FFT. Multiple radix-2 butterflies implemented in this way may be combined together to form yet higher order radix butterflies.

In another suitable arrangement, at least three DSP blocks may be connected in a chain to implement complex multiplier circuitry that receives first and second complex input signals and outputs a complex product output signal. The complex multiplier circuitry may require a fourth DSP block to implement a Karatsuba decomposition for generating the complex output signal. The Karatsuba decomposition may also require two adders that are separate from the four DSP blocks. In another embodiment, only the three DSP blocks may be needed to implement a Gaussian method for generating the complex output signal. The Gaussian method may require either three adders or only one adder external to the three DSP blocks in the chain.

Further features of the invention, its nature and various advantages will be more apparent from the accompanying drawings and following detailed description.

DETAILED DESCRIPTION

The embodiments presented herein relate to integrated circuits and, more particularly, to digital signal processors that can be used to perform complex arithmetic operations on an integrated circuit. It will be recognized by one skilled in the art, that the present exemplary embodiments may be practiced without some or all of these specific details. In other instances, well-known operations have not been described in detail in order not to unnecessarily obscure the present embodiments.

Figure 1:
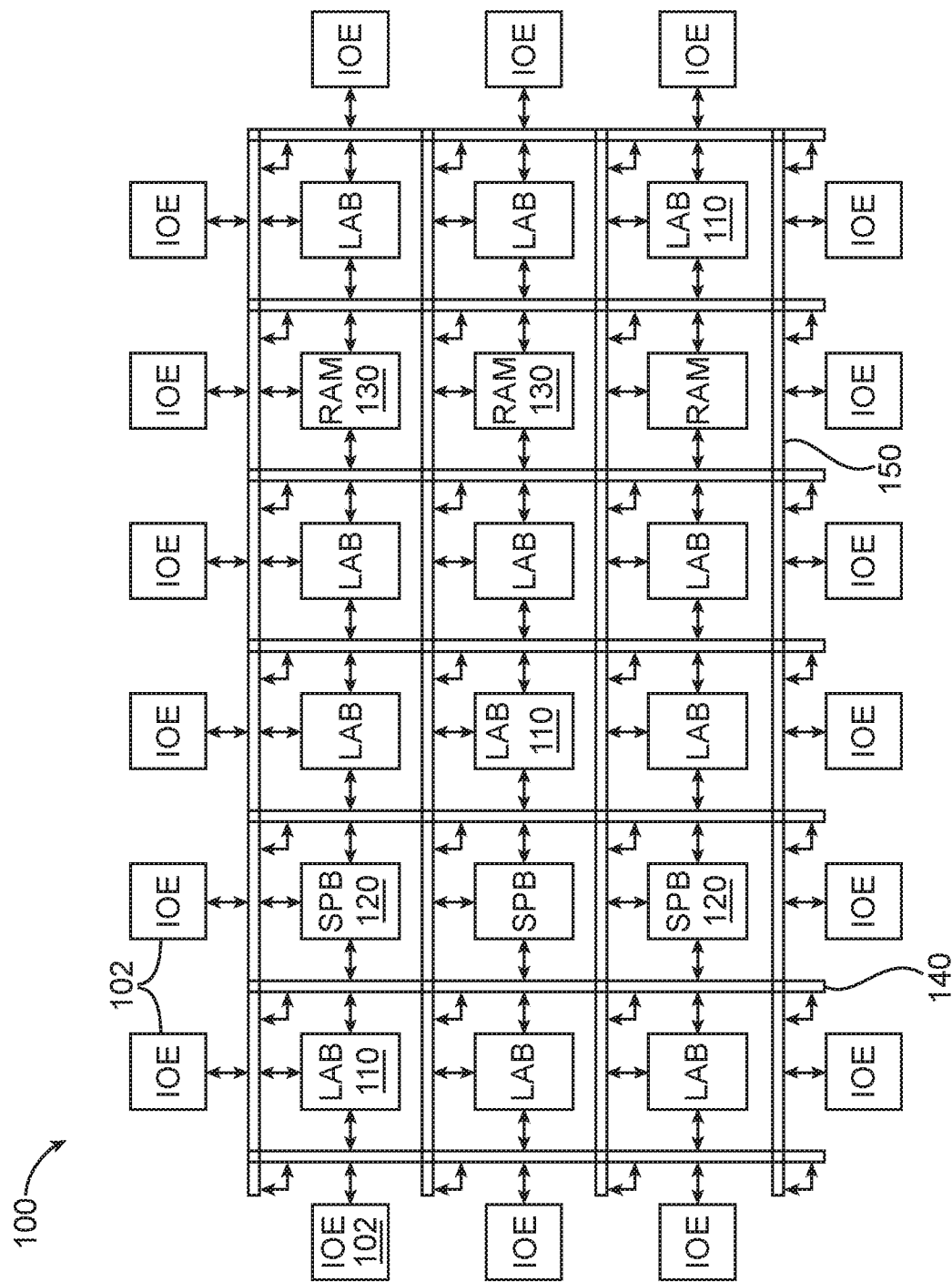
FIG. 1 is a diagram of an illustrative programmable integrated circuit in accordance with an embodiment.

An illustrative embodiment of an integrated circuit such as programmable logic device (PLD) 100 is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and specialized processing blocks such as specialized processing blocks (SPB) 120. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, SPB 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, mechanical memory devices (e.g., including localized mechanical resonators), mechanically operated RAM (MORAM), combinations of these structures, etc. Because the memory elements are loaded with configuration data during programming, the memory elements are sometimes referred to as configuration memory, configuration RAM (CRAM), configuration memory elements, or programmable memory elements.

In addition, the programmable logic device may have input/output elements (IOEs) 102 for driving signals off of device 100 and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip.

If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections.

If desired, routing wires may be shorter than the entire length of the routing channel. A length L wire may span L functional blocks. For example, a length four wire may span four blocks. Length four wires in a horizontal routing channel may be referred to as "H4" wires, whereas length four wires in a vertical routing channel may be referred to as "V4" wires.

Different PLDs may have different functional blocks which connect to different numbers of routing channels. A three-sided routing architecture is depicted in FIG. 1 where input and output connections are present on three sides of each functional block to the routing channels. Other routing architectures are also intended to be included within the scope of the present invention. Examples of other routing architectures include 1-sided, 1½-sided, 2-sided, and 4-sided routing architectures.

In a direct drive routing architecture, each wire is driven at a single logical point by a driver. The driver may be associated with a multiplexer which selects a signal to drive on the wire. In the case of channels with a fixed number of wires along their length, a driver may be placed at each starting point of a wire.

Note that other routing topologies, besides the topology of the interconnect circuitry depicted in FIG. 1, are intended to be included within the scope of the present invention. For example, the routing topology may include diagonal wires, horizontal wires, and vertical wires along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
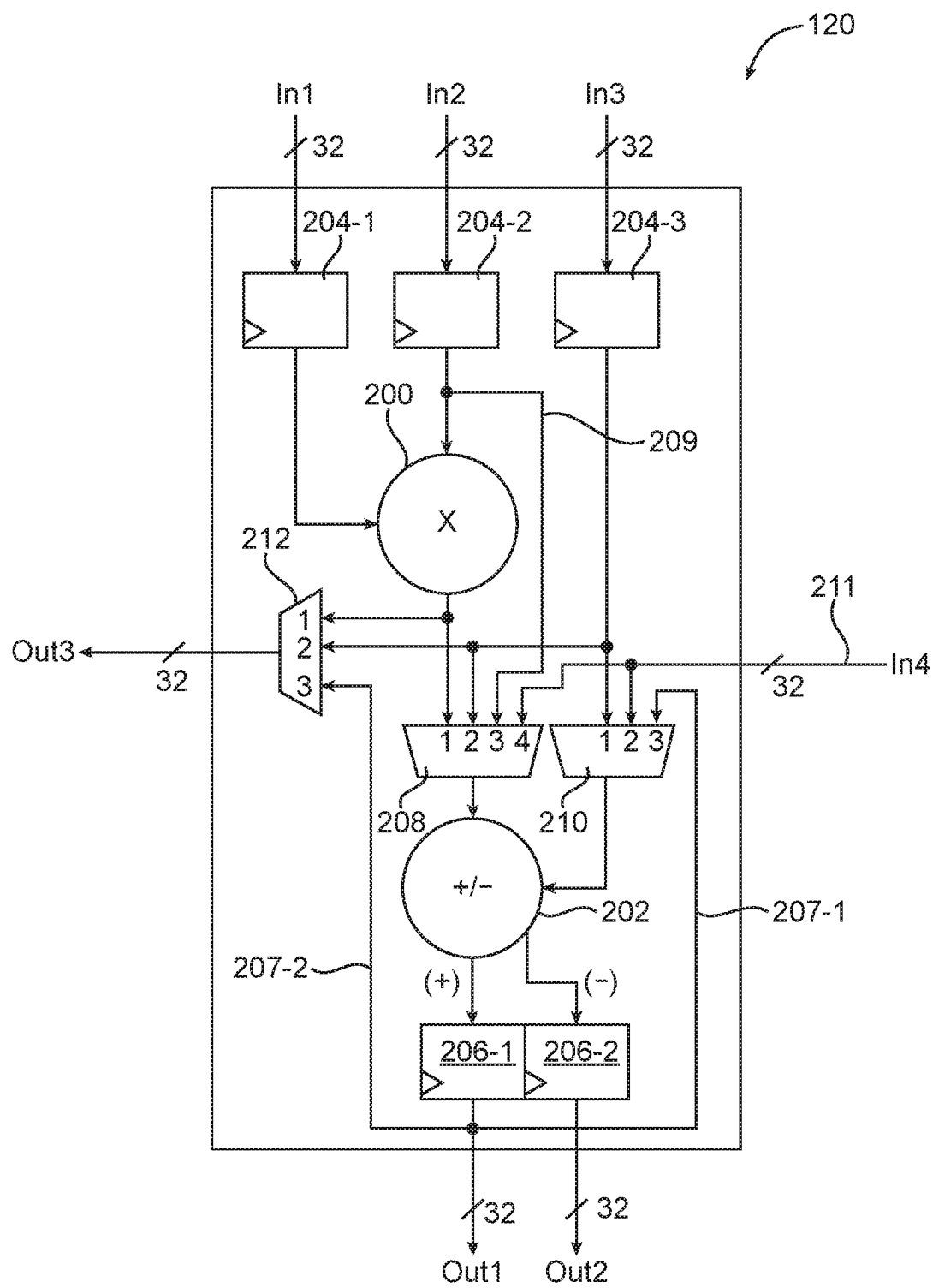
FIG. 2 is a diagram of an illustrative specialized processing block in accordance with an embodiment.

FIG. 2 is a diagram showing how a specialized processing block such as block 120 may include various floating-point arithmetic operator circuits such as a floating-point multiplication circuit 200 and a floating-point adder circuit 202.

Floating-point numbers are commonplace for representing real numbers in scientific notation in computing systems and are designed to cover a large numeric range and diverse precision requirements. The IEEE 754 standard is commonly used for floating-point numbers. A floating-point number includes three different parts: (1) the sign of the floating-point number, (2) the mantissa, and (3) the exponent. Each of these parts may be represented by a binary number and, in the IEEE 754 format, have different bit sizes depending on the precision.

For example, a single precision floating-point number requires 32 bits, which are distributed as follows: one sign bit (bit 32), eight exponent bits (bits [31:24]), and 23 mantissa bits (bits [23:1]). A double precision floating-point number requires 64 bits including one sign bit (bit 64), 11 exponent bits (bits [63:53]), and 52 mantissa bits (bits [52:1]). The example of FIG. 2 in which DSP block 120 supports single precision 32-bit inputs and outputs is merely illustrative and does not serve to limit the scope of the present embodiments. In general, DSP block 120 may be configured to support a wide range of precisions (e.g., to support 10-bit mantissa, 11-bit mantissas, 12-bit mantissas, 14-bit mantissa, 23-bit mantissas, or other suitable mantissa widths). In yet other suitable embodiments, multiplier 200 and adder 202 may alternatively be fixed-pointed arithmetic circuits.

In general, specialized processing block 120 may include a concentration of circuitry that has been partially or fully hardwired to perform one or more specific tasks, such as a logical or a mathematical operation. Specialized processing block 120 may also contain one or more specialized structures, such as an array of configurable memory elements. One particularly useful type of specialized processing block that has been provided on programmable logic devices (PLDs) is a digital signal processing (DSP) block that can be used to process audio signals (as an example). Such blocks may sometimes be referred to as multiply-accumulate ("MAC") blocks, when they include structures to perform multiplication operations, sums, and/or accumulations of multiplication operations.

The implementation of some applications may require more than one specialized processing block. Examples for such functions include the implementation of vector (dot product) operations or sum-of-product operations such as finite impulse response (FIR) filters, fast Fourier transform (FFT) operations, to name a few. Signals produced in a given specialized processing block and consumed in another specialized processing block may sometimes require the use of interconnect resources outside the specialized processing block. The use of such resources may not be efficient in terms of delay and power consumption. Therefore, it may be desirable to introduce direct interconnect resources between adjacent specialized processing blocks together with configurable interconnect circuitry that may route signals to and from those direct interconnect resources.

Referring still to FIG. 2, DSP block 120 may further include (in addition to multiplier 200 and adder 202) input registers 204-1, 204-2, and 204-3, output registers 206-1 and 206-2, and routing multiplexers 208, 210, and 212. Input register 204-1 may receive a first input signal In1 at a first input port of block 120; input register 204-2 may receive a second input signal In2 at a second input port of block 120; and input register 204-3 may receive a third input signal In3 at a third input port of block 120. Input signals In1, In2, and In3 may be routed to the input ports of DSP block 120 via external interconnection resources.

Multiplier 200 may have a first input that receives signals from first input register 204-1, a second input that receives signals from second input register 204-2, and an output at which a corresponding product signal is generated. Multiplexer 208 may have a first (1) input that receives the product signal from multiplier 200, a second (2) input that receives signals directly from third input register 204-3, a third (3) input that receives signals directly from second input register 204-2 via bypass path 209, a fourth (4) input that receives a fourth input signal In4 at a fourth input port of block 120, and an output. The fourth input port may be connected directly to an adjacent DSP block 120 (e.g., input signal In4 may be received via hardwired direct connection path 211). The use of fixed direct connection paths between adjacent DSP blocks helps to reduce routing complexity for external programmable interconnection routing resources that would otherwise be needed to route output signals from one DSP block to inputs of another DSP block when multiple DSP blocks 120 are connected in a chain.

Multiplexer 210 may have a first (1) input that receives signals directly from third input register 204-3, a second (2) input that receives input signal In4 from direct connection path 211, a third (3) input that receives output signal Out1 from output register 206-1 via feedback path 207-1, and an output.

Adder 202 may have a first input that receives signals from the output of multiplexer 208, a second input that receives signals from the output of multiplexer 210, a first (+) output on which a corresponding sum is provided, and a second (−) output on which a corresponding difference is provided. Adder circuit 202 (sometimes referred to as a combined or hybrid adder) that is capable of generating simultaneously both sum and difference floating-point signals in this way is described in commonly-assigned U.S. Pat. No. 8,645,449, which is incorporated by reference in its entirety. The sum output is latched using first output register 206-1, whereas the difference output is latched using second output register 206-2. Register 206-1 has an output at which output signal Out1 of block 120 is provided, whereas register 206-2 has an output at which output signal Out2 of block 120 is provided (i.e., the outputs of registers 206 may serve as output ports of block 120).

Multiplexer 212 may include a first (1) input that is directly connected to the output of multiplier 200, a second (2) input that is directly connected to the output of input register 204-3, a third (3) input that receives signal Out1 via feedback path 207-2, and an output at which output signal Out3 is provided. When multiple DSP blocks 120 are connected in series, output signal Out3 may be fed directly to a succeeding DSP block via hardwired path 211 and shall serve as input signal In4 for the succeeding DSP block.

Input registers 204 (e.g., registers 204-1, 204-2, and 204-3) and output registers 206 (e.g., registers 206-1 and 206-2) may be controlled using the same clock signal or using different clock signals. Multiplexers 208, 210, and 212 may be generally controlled using different control signals to provide the desired routing configuration. Configured in the exemplary arrangement of FIG. 2, intermediate outputs within DSP block 120 can be routed simultaneously to multiple different destinations. For example, the output of multiplier 200 may be routed simultaneously to both multiplexer 208 and 212. As another example, the output of register 204-3 may also be routed simultaneously to both multiplexers 208 and 212. As yet another example, input signal In4 may be routed simultaneously to both multiplexers 208 and 210. Simultaneous internal routing connections formed in this way can help improve both performance and power density for DSP block 120.

Figure 3:
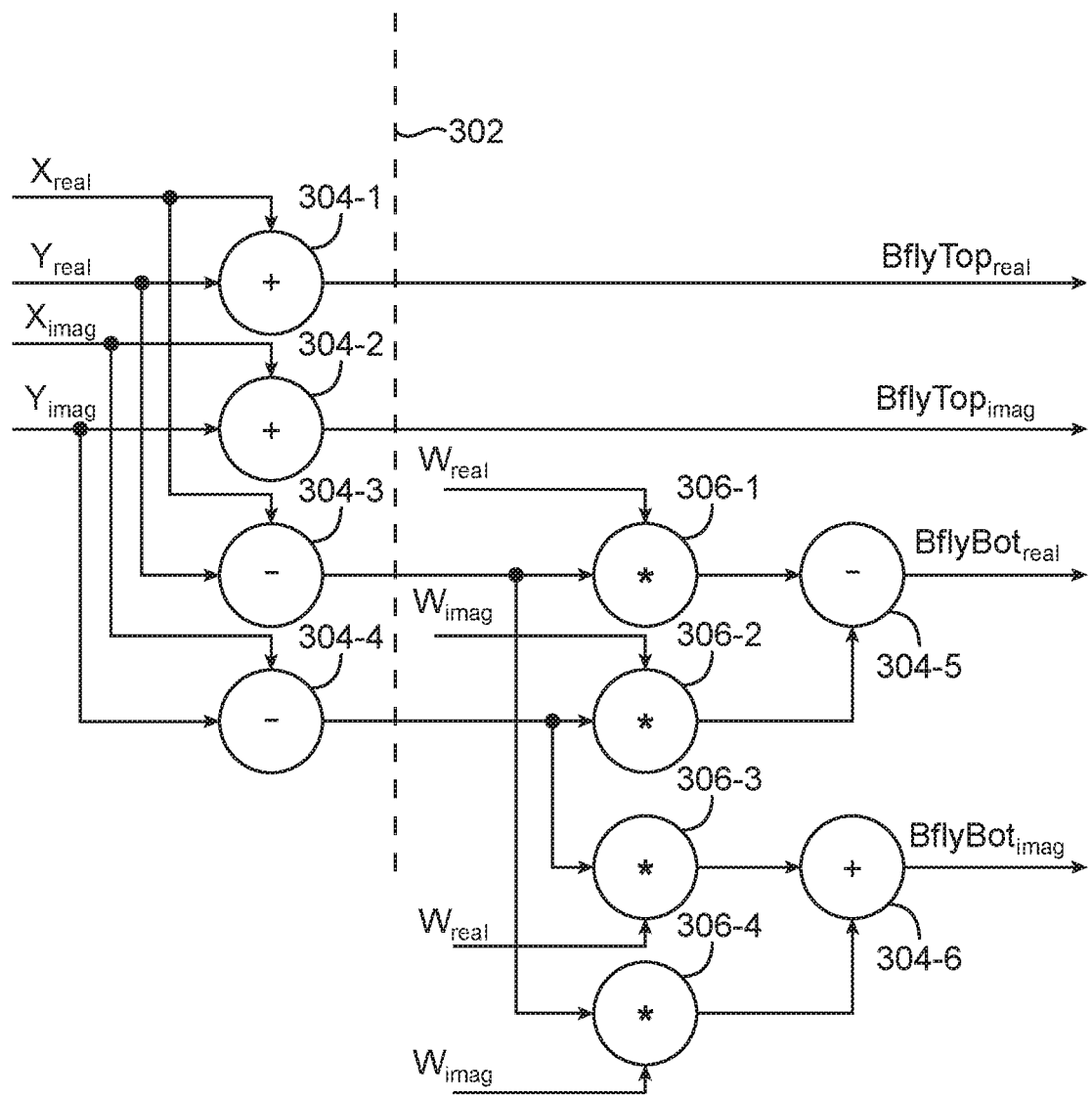
FIG. 3 is a diagram of an illustrative radix-2 butterfly operation in accordance with an embodiment.

In accordance with an embodiment, DSP block 120 of the type described in connection with FIG. 2 may be suitable for performing fast Fourier transform (FFT) operations. FIG. 3 shows the data flow of a radix-2 FFT butterfly computation. A "butterfly" refers to a portion of the FFT algorithm that combines the results of smaller discrete Fourier transforms (DFT) into a larger DFT, or vice versa. This structural flow may appear in the context of the Cooley-Tukey FFT algorithm or the Viterbi algorithm (as examples). A radix-2 butterfly can be used to construct higher radix butterflies (e.g., radix-4 butterflies, radix-6 butterflies, radix-8 butterflies, etc.).

As shown in FIG. 3, the radix-2 butterfly may receive two complex inputs X and Y. Complex input X has a real portion Xreal and an imaginary portion Ximag. Similarly, complex input Y has a real portion Yreal and an imaginary portion Yimag. The radix-2 butterfly may generate two corresponding complex butterfly top and bottom outputs BflyTop and BflyBot, which both have a real portion (i.e., $BflyTop_{real}$ and $BflyBot_{real}$) and an imaginary portion (i.e., $BflyTop_{imag}$ and $BflyBot_{imag}$). In particular, signal $BflyTop_{real}$ may be generated by adding signals Xreal and Yreal at step 304-1, whereas signal $BflyTop_{imag}$ may be generated by adding signals Ximag and Yimag at step 304-2.

At step 304-3, signal Yreal may be subtracted from signal Xreal to obtain a first intermediate difference value. At step 304-4, signal Yimag may be subtracted from signal Ximag to obtain a second intermediate difference value. These intermediate difference values may then be multiplied by a complex twiddle factor W and then subsequently combined to produce the BflyBot signals. The twiddle factor may have a real portion Wreal and an imaginary portion Wimag. In particular, the first intermediate difference value may be scaled by factor Wreal (at step 306-1) while the second intermediate difference value is scaled by factor Wimag (at step 306-2), the results of which may be subtracted at step 304-5 to generate output $BflyBot_{real}$. Similarly, the first intermediate difference value may also be scaled by factor Wimag (at step 306-4) while the second intermediate different value is scaled by factor Wreal (at step 306-3), the results of which may be added together at step 304-6 to generate output $BflyBot_{imag}$.

By inspection, the radix-2 butterfly flow includes six real addition-type (+/−) operations and four real multiplication operations. In other words, FFT operations require a 1.5 ratio of multipliers to adders. Conventional DSP blocks, however, only include a 1:1 ratio of multipliers to adders. Implementing an FFT algorithm using conventional DSP blocks would therefore be inefficient, particularly when there is also a large number of wide buses (e.g., 32-bit wide buses or more) in the butterfly structure.

Figure 4:
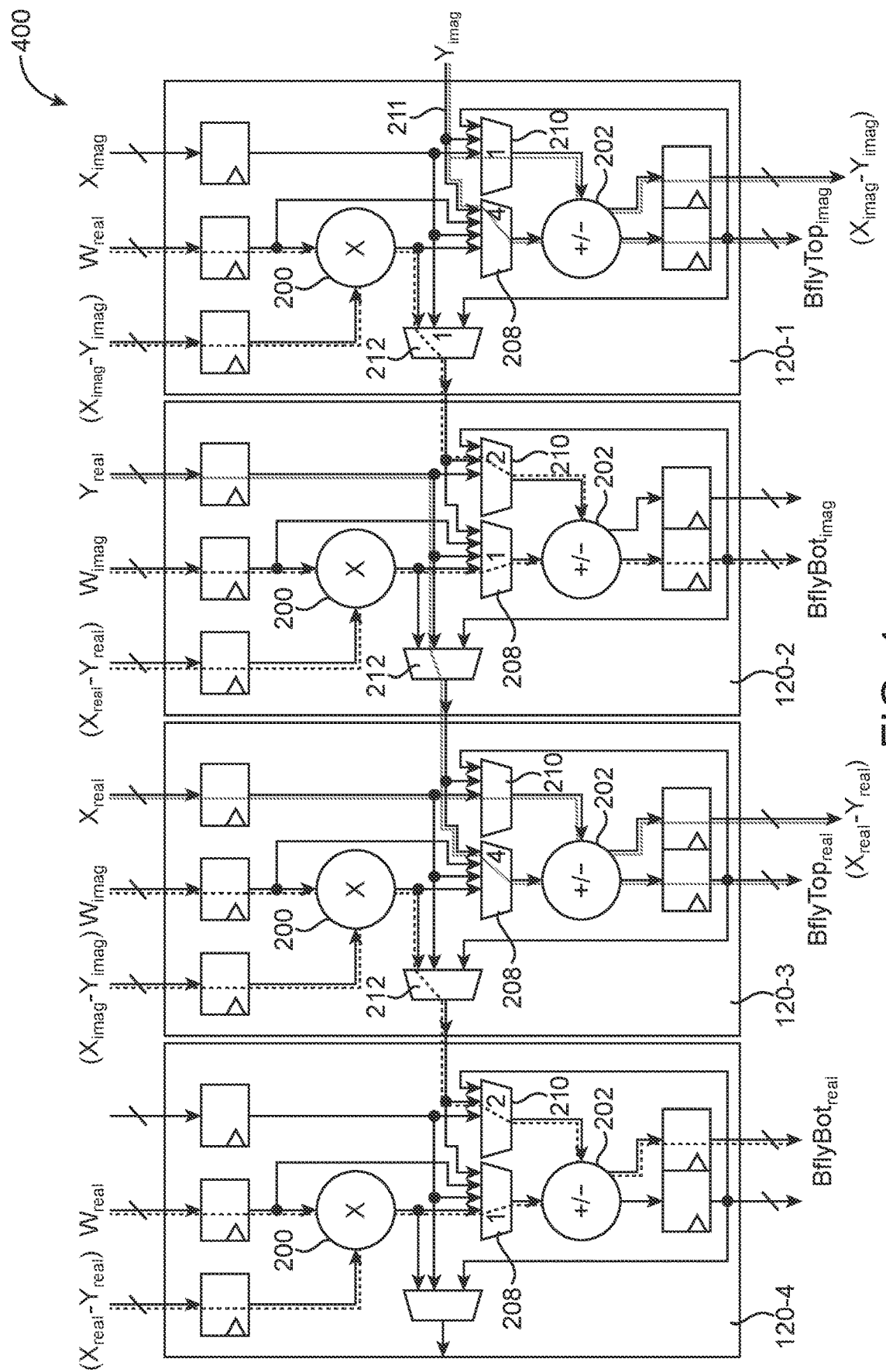
FIG. 4 is a diagram showing how a chain of specialized processing blocks of the type shown in FIG. 2 can be used to support the radix-2 butterfly operation in accordance with an embodiment.

FIG. 4 shows one suitable embodiment of DSP circuitry 400 that is configured to support a radix-2 butterfly while using a much smaller set of soft routing connections compared to conventional FFT circuitry. As shown in FIG. 4, DSP circuitry 400 may include only four DSP blocks 120 connected in a chain (e.g., DSP blocks 120-1, 120-2, 120-3, and 120-4) and thus includes a total of only four multipliers 200 and four adders 202. The four addition operations (e.g., steps 304-1, 304-2, 304-3, and 304-4 to the left of dotted line 302 in FIG. 3) are shown in the shaded signal paths of FIG. 4, whereas the multiplication operations (steps 304 and 306 to the right of dotted line 302) are represented by the dashed signal paths.

In particular, block 120-1 may receive signal Ximag at its third input port and Yimag at its fourth input port. Signal Yimag may be received at the third unused input port of a preceding DSP block (not shown) and routed to DSP block 120-1 via path 211. For example, the third input port of DSP block 120-4 is unused and can be used to receive signal Yimag for another set of four DSP blocks. Multiplexer 208 in block 120-1 may be configured to route signal Yimag to the top input of adder 202 in block 120-1, whereas multiplexer 210 in block 120-1 may be configured to route signal Ximag to the right input of adder 202 in block 120-1 (see shaded paths). Adder 202 may then output a corresponding sum signal, which is equal to $BflyTop_{imag}$, and a corresponding first difference signal, which is equal to (Ximag−Yimag). The first difference signal may then be routed via external soft routing interconnection resources back to the first input port of block 120-1. Multiplier 200 of block 120-1 may receive this difference value and signal Wreal from its second input port and generate a first product signal, which is then routed directly to the fourth input port of block 120-2 via multiplexer 212.

Referring now to DSP block 120-3, block 120-3 may receive signal Xreal at its third input port and Yreal at its fourth input port. Signal Yreal may be received at the third input port of preceding DSP block 120-2 and routed to DSP block 120-3 using multiplexer 212 in block 120-2. Multiplexer 208 in block 120-3 may be configured to route signal Yreal to the top input of adder 202 in block 120-3, whereas multiplexer 210 in block 120-3 may be configured to route signal Xreal to the right input of adder 202 in block 120-3 (see shaded paths). Adder 202 of block 120-3 may then output a corresponding sum signal, which is equal to $BflyTop_{real}$, and a corresponding second difference signal, which is equal to (Xreal−Yreal). The first difference signal (Ximag−Yimag) generated at the second output port of block 120-1 may then be routed via external soft routing interconnection resources back to the first input port of block 120-3. Multiplier 200 of block 120-3 may receive the first difference value and also signal Wimag from its second input port and generate a second product signal, which is then routed directly to the fourth input port of block 120-4 via multiplexer 212 of block 120-3.

Referring now to DSP block 120-2, DSP block 120-2 may receive at its first input port the second difference signal that is routed from the second output port of block 120-3 via external soft routing interconnections and signal Wimag at its second input port. Multiplier 200 within block 120-1 may receive these two signals and generate a corresponding third product signal. Multiplexer 208 in block 120-2 may be configured to route the third product signal to the top input of adder 202 in block 120-2, whereas multiplexer 210 in block 120-2 may be configured to route the first product signal to the right input of adder 202 in block 120-2. Adder 202 in block 120-2 may then generate a corresponding sum signal that is equal to BflyBot$_{imag}$.

Referring now to DSP block 120-4, DSP block 120-4 may also receive at its first input port the second difference signal that is routed from the second output port of block 120-3 via external soft routing interconnections and signal Wreal at its second input port. Multiplier 200 within block 120-4 may receive these two signals and generate a corresponding fourth product signal. Multiplexer 208 in block 120-4 may be configured to route the fourth product signal to the top input of adder 202 in block 120-4, whereas multiplexer 210 in block 120-4 may be configured to route the second product signal to the right input of adder 202 in block 120-4. Adder 202 in block 120-4 may then generate a corresponding difference signal that is equal to BflyBot$_{real}$.

Configured in this way, the 1:1 multiplier to adder ratio in circuitry 400, coupled with the use of arithmetic circuits 202 that are capable of outputting both sum and difference values, effectively supports a 1:1.5 multiplier to adder operation ratio. All internal direct connection paths are used without any conflict. Only one bus is used between any two adjacent DSP blocks and always in the same direction (e.g., from right to left). Arranged as such, the adder portion (represented by the shaded paths) and the multiplier portion (represented by the dotted paths) can be separated.

Figure 5:
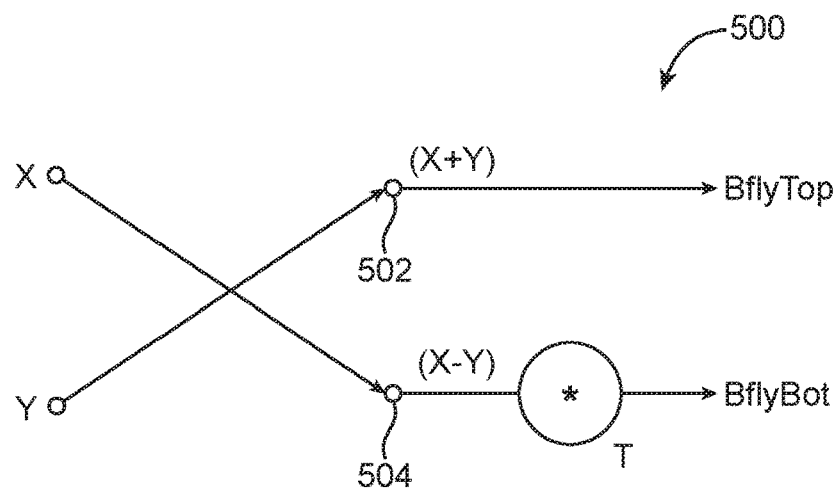
FIG. 5 is a diagram showing a graphical representation of a radix-2 butterfly operation in accordance with an embodiment.
Figure 6:
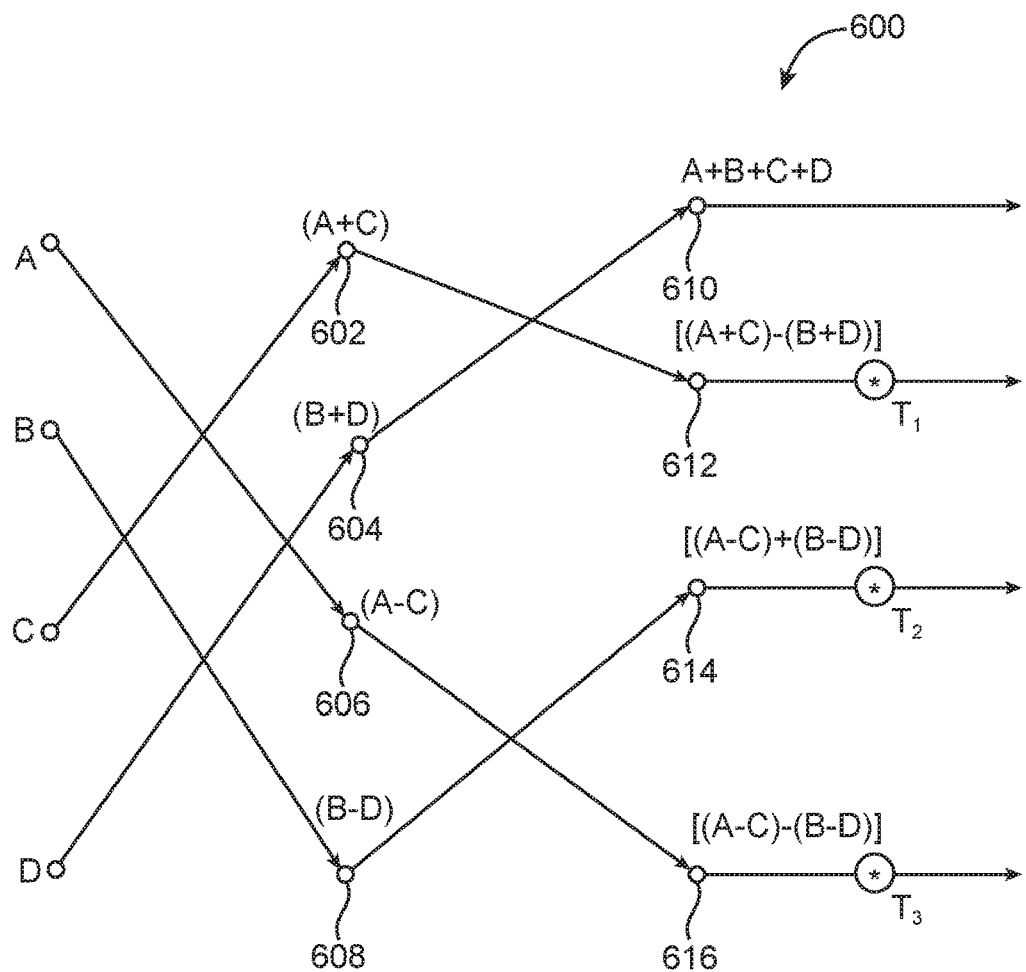
FIG. 6 is a diagram showing a graphical representation of a radix-4 butterfly operation in accordance with an embodiment.

The radix-2 butterfly structure of FIG. 4 may also be used to build a radix-4 butterfly. FIGS. 5 and 6 are graphical representations that illustrate the differences between a radix-2 butterfly and a radix-4 butterfly. As shown in graph 500 of FIG. 5, the radix-2 butterfly receives two complex inputs X and Y and performs a single cross or butterfly computation. At step 502, a sum of X+Y is computed. At step 504, a difference of X−Y is computed. The sum, which may include a real portion and an imaginary portion, is equal to signal BflyTop. The difference may be scaled by a complex twiddle factor T to generate signal BflyBot, which is also a complex value. FIG. 5 is therefore a simplified graphical representation of FIG. 3.

FIG. 6 is a graphical representation of a radix-4 butterfly, which is sometimes referred to as a "dragonfly." As shown in FIG. 6, radix-4 dragonfly graph 600 may have four complex inputs A-D and generate four complex outputs. The particular implementation of FIG. 6 implements the radix-4 butterfly in two stages. The first stage only has addition-type operations. For example, a first complex sum (A+C) is computed at step 602; a second complex sum (B+D) is computed at step 604; a first complex difference (A−C) is computed at step 606; and a second complex difference (B−D) is computed at step 608. The complex multiplies are not shown for the first stage since they reduce to (1, 0), (−1, 0), (0, j), and (0, −j), which can all be accomplished by trivial operations such as switching real and complex values or negation. Negation in floating-point representation is trivial since only the sign bit needs to be inverted.

The second stage may have both addition and multiplier operations. For example, a first complex output (A+B+C+D) is computed at step 610; a second complex output is computed at step 612 by scaling difference value [(A+C)−(B+D)] by a first twiddle factor T1; a third complex output is computed at step 614 by scaling sum value [(A−C)+(B−D)] by a second twiddle factor T2; and a fourth complex output is computed at step 616 by scaling difference value [(A−C)−(B−D)] by a third twiddle factor R3. By inspection, the radix-4 butterfly structure may be constructed from four radix-2 butterflies, except one of the radix-2 butterflies has two complex multipliers (i.e., the bottom right portion of FIG. 6). In other words, 16 DSP blocks 120 may be interconnected using direct connection paths and also external soft routing connections to implement the radix-4 dragonfly.

The net result is 16 real addition operations before the complex multiplies (since each step involves real and imaginary add/subtract), and three complex multiplies. As described above, the complex multiplication operations are independent of the adder stage, so any one of the complex multiplies that would be available in the first stage may be used for the additional complex multiply in the second stage. This leaves one complex multiply that would otherwise have been used in the first stage unused, but since it is independent of the adder portion of the butterfly, it can be used elsewhere for processing. The other advantage of using a radix-4 construct is that the latency and power consumption will be lower than then radix-2 butterfly, because an entire layer of complex multipliers is bypassed.

In accordance with another suitable embodiment, specialized processing block 120 of the type shown in FIG. 2 may also be used outside the context of an FFT operation to support other complicated arithmetic operations such as a complex multiply operation. A complex multiply can generally be expressed as follows:

$$(A+Bj)*(C+Dj)=(AC-BD)+j(AD+BC) \quad (1)$$

As shown in equation 1 above, A represents the real portion of a first complex number, B represents the imaginary portion of the first number, C represents the real portion of a second complex number that is being multiplied with the first complex number, and D represents the imaginary portion of the second complex number. The resulting product has a real portion that is equal to (AC−BD) and an imaginary portion that is equal to (AD+BC).

One way of obtaining these final results is to first generate three partial products: (1) (A+B)*(C+D), (2) AC, and (3) BD. The final real portion can then be obtained by computing [(2) minus (3)], whereas the final imaginary portion can be obtained by computing [(1) minus (2) minus (3)]. This type of complex multiply implementation is sometimes referred to as the Karatsuba decomposition, which can be implemented using the arrangement of FIG. 7.

Figure 7:
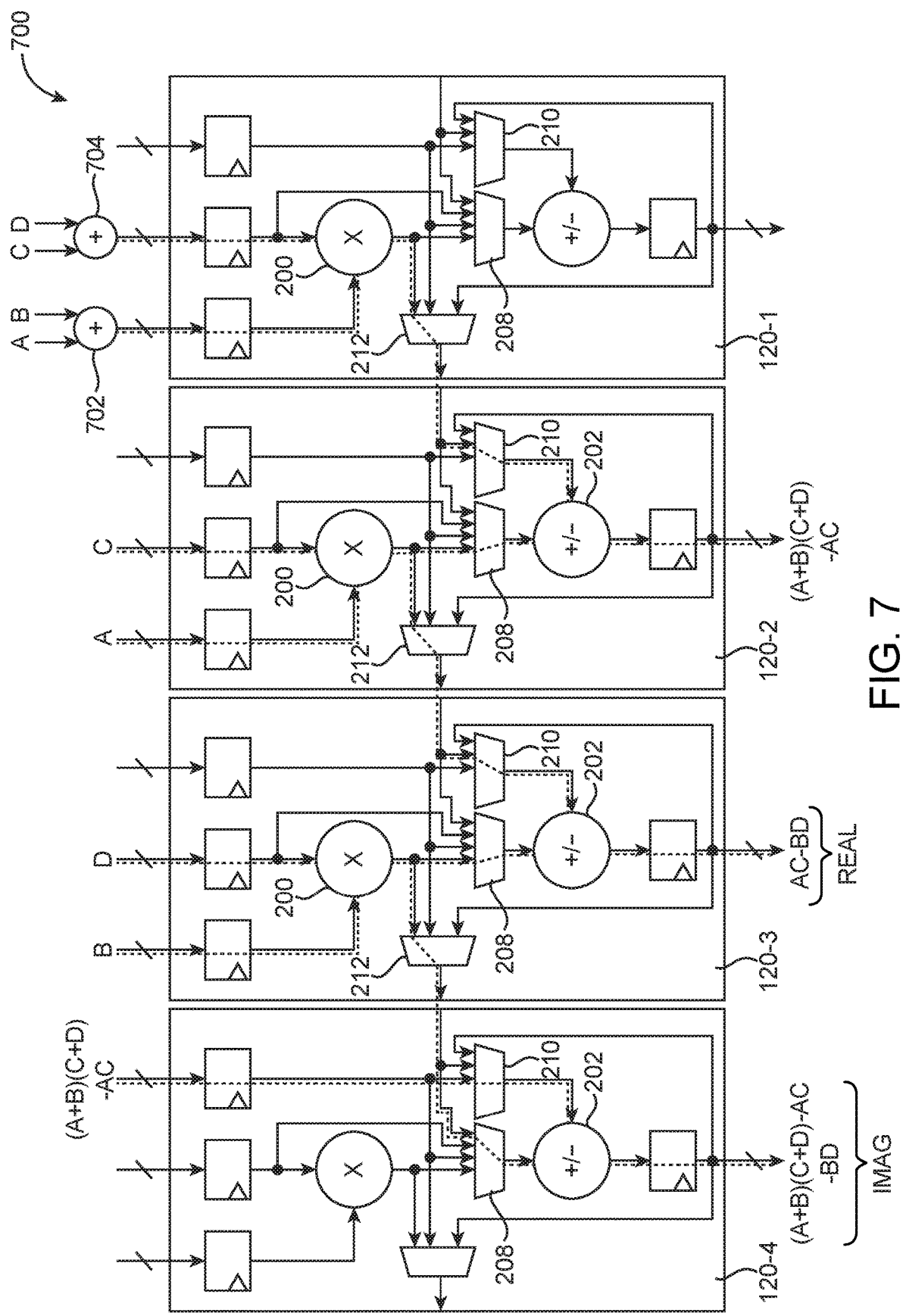
FIGS. 7-9 are diagrams showing various exemplary circuit implementations of a complex multiplication operation in accordance with an embodiment.

As shown in FIG. 7, complex multiplier circuitry 700 may include four DSP blocks 120-1, 120-2, 120-3, and 120-4 that are connected in series. Two additional floating-point adder circuits 702 and 704 are needed outside the DSP blocks. Adder 702 may receive A and B and output sum (A+B). Similarly, adder 704 may receive C and B and output sum (C+D). These two sums may be passed to the inputs of multiplier 200 in block 120-1 and the corresponding product (A+B)*(C+D) may then be routed directly to the fourth input port of block 120-1 via multiplexer 212 in block 120-1.

Meanwhile, block 120-2 may receive A and C at its first and second input ports, respectively. The third input port of block 120-2 may be unused. Multiplier 200 in block 120-2 may receive signals A and C and output a corresponding product (AC). Multiplexer 208 in block 120-2 may be configured to route product AC to the top input of adder 202 in block 120-2, whereas multiplexer 210 in block 120-2 may be configured to route product (A+B)*(C+D) to the right input of adder 202 in block 120-2 (see dashed paths). Adder 202 of block 120-2 may then generate a difference value [(A+B)*(C+D)−AC]. Moreover, multiplier 200 of block 120-2 may simultaneously route product signal AC directly to the fourth input port of block 120-3 via multiplexer 212 of block 120-2.

Block 120-3 may receive B and D at its first and second input ports, respectively. The third input port of block 120-3 may also be unused. Multiplier 200 in block 120-3 may receive signals B and D and output a corresponding product (BD). Multiplexer 208 in block 120-3 may be configured to route product BD to the top input of adder 202 in block 120-3, whereas multiplexer 210 in block 120-3 may be configured to route product AC received directly from block 120-2 to the right input of adder 202 in block 120-3 (see dashed paths). Adder 202 of block 120-3 may then generate a difference value (AC−BD), which represents the real portion of the desired output (see, e.g., equation 1 above). Moreover, multiplier 200 of block 120-3 may simultaneously route product signal BD directly to the fourth input port of block 120-4 via multiplexer 212 of block 120-3.

Block 120-4 may receive at its third input port difference value [(A+B)*(C+D)−AC] from the external output port of block 120-2 via external soft routing interconnection resources. Multiplexer 208 in block 120-4 may be configured to route product BD to the top input of adder 202 in block 120-4, whereas multiplexer 210 in block 120-4 may be configured to route difference value [(A+B)*(C+D)−AC] to the right input of adder 202 in block 120-4 (see dashed paths). Adder 202 of block 120-4 may then generate a new difference value {[(A+B)*(C+D)−AC]−BD}, which simplifies to (AD+BC), the imaginary portion of the desired output.

In the example of FIG. 7, the output of multiplier 200 in at least blocks 120-2 and 120-3 are simultaneously routed to different destinations (e.g., both down to multiplexer 208 and left to multiplexer 212). Since the first and second input ports of block 120-4 are unused, multiple groups of four DSP blocks can be chained together such that the two unused ports of block 120-4 can serve as the first and second ports of block 120-1 in the next group that receive (A+B) and (C+B), respectively. In other words, block 120-4 in a given group 700 can overlap with block 120-1 in an adjacent group 700 (i.e., at least one DSP block can be shared between two adjacent complex multiply circuitries 700).

In another suitable arrangement, three partial products can first be generated: (1') A*(C+D), (2') D*(A+B), and (3') C*(B−A). The real portion of the final product can then be obtained by computing [(1') minus (2')], whereas the final imaginary portion can be obtained by computing [(1') plus (3')]. This type of complex multiply implementation is sometimes referred to as the Gaussian decomposition, which can be implemented using the arrangement of FIG. 8.

Figure 8:
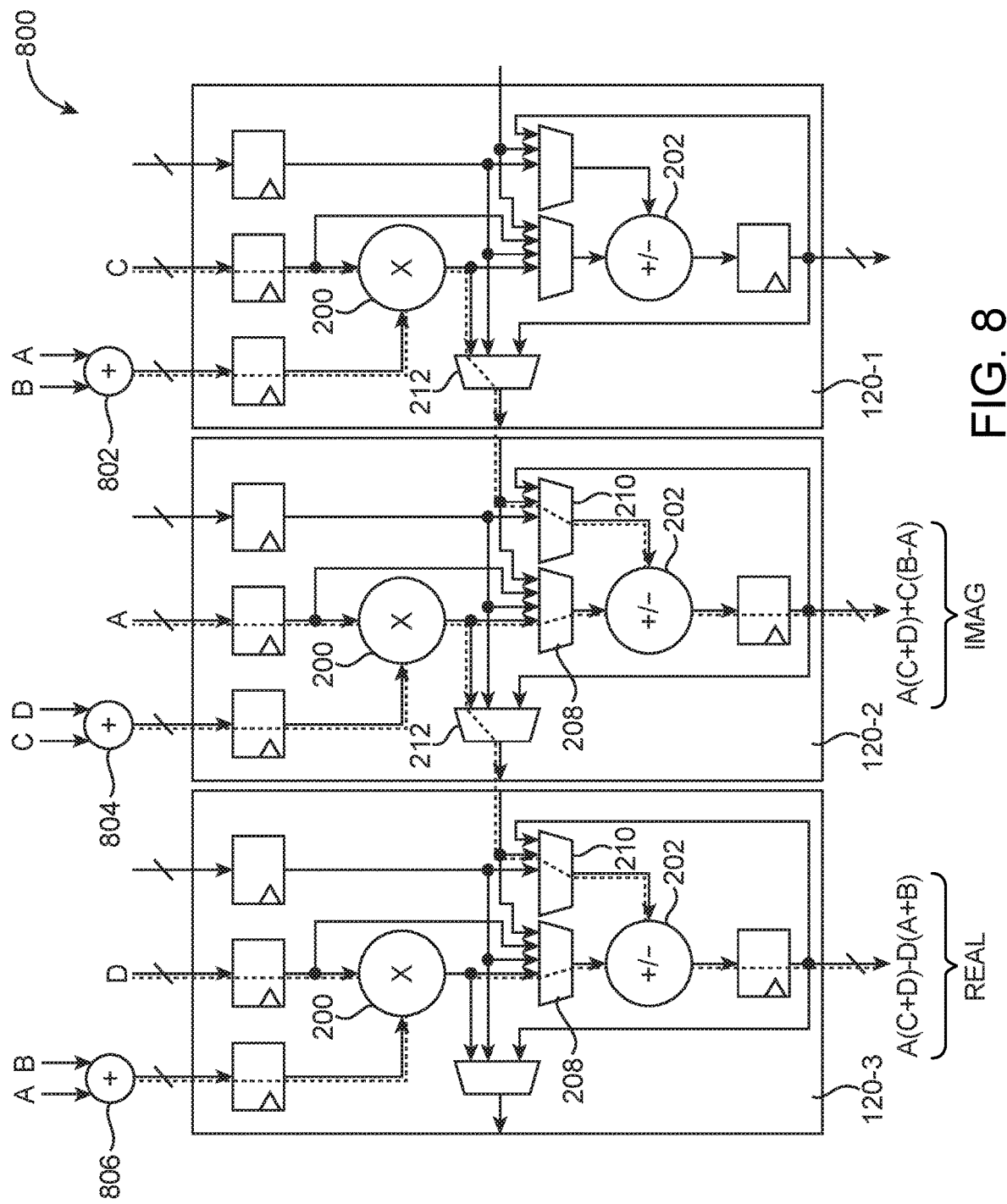

As shown in FIG. 8, complex multiplier circuitry 800 may include only three DSP blocks 120-1, 120-2, and 120-3 that are connected in series. Three additional floating-point adder circuits 802, 804, and 806 are needed outside the DSP blocks. Adder 802 may receive B and A and output difference (B−A). Adder 804 may receive C and D and output sum (C+D). Adder 806 may receive A and B and output sum (A+B). Block 120-1 may receive difference (B−A) from the output of adder 802 and also C at its second input port. Multiplier 200 of block 120-1 may receive these two inputs and compute a corresponding product C*(B−A), which may then be passed directly to the fourth input port of block 120-2 via multiplexer 212 of block 120-1.

Meanwhile, block 120-2 may receive sum (C+D) from the output of adder 804 and also A at its second input port. Multiplier 200 of block 120-2 may receive these two inputs and compute a corresponding product A*(C+D), which may then be passed directly to the fourth input port of block 120-3 via multiplexer 212 of block 120-2. Multiplexer 208 in block 120-2 may be configured to simultaneously route product A*(C+D) to the top input of adder 202 in block 120-2, whereas multiplexer 210 in block 120-2 may be configured to route product C*(B−A) to the right input of adder 202 in block 120-2 (see dashed paths). Adder 202 of block 120-2 may then generate a sum value [A(C+D)+C(B−A)], which simplifies to (AD+BC)—the imaginary portion of the desired output.

Referring now to block 120-3, block 120-3 may receive sum (A+B) from the output of adder 806 and also D at its second input port. Multiplier 200 of block 120-3 may receive these two inputs and compute a corresponding product D*(A+B). Multiplexer 208 in block 120-3 may be configured to route product D*(A+B) to the top input of adder 202 in block 120-3, whereas multiplexer 210 in block 120-3 may be configured to route product A*(C+D) to the right input of adder 202 in block 120-3 (see dashed paths). Adder 202 of block 120-3 may then generate a difference value [A(C+D)−D(A+B)], which simplifies to (AC−BD)—the real portion of the desired output.

Compared to the implementation of FIG. 7, the configuration of FIG. 8 employs a simpler internal connection pattern at the expense of one addition external adder (i.e., three external adders instead of two). In yet another suitable version of the Gaussian decomposition, three partial products can first be generated: (1") B*(C−D), (2") C*(A−B), and (3") D*(A+B). The real portion of the final product can then be obtained by computing [(1") plus (2")], whereas the final imaginary portion can be obtained by computing [(1") plus (3")]. This type of complex multiply implementation is shown in the arrangement of FIG. 9.

Figure 9:
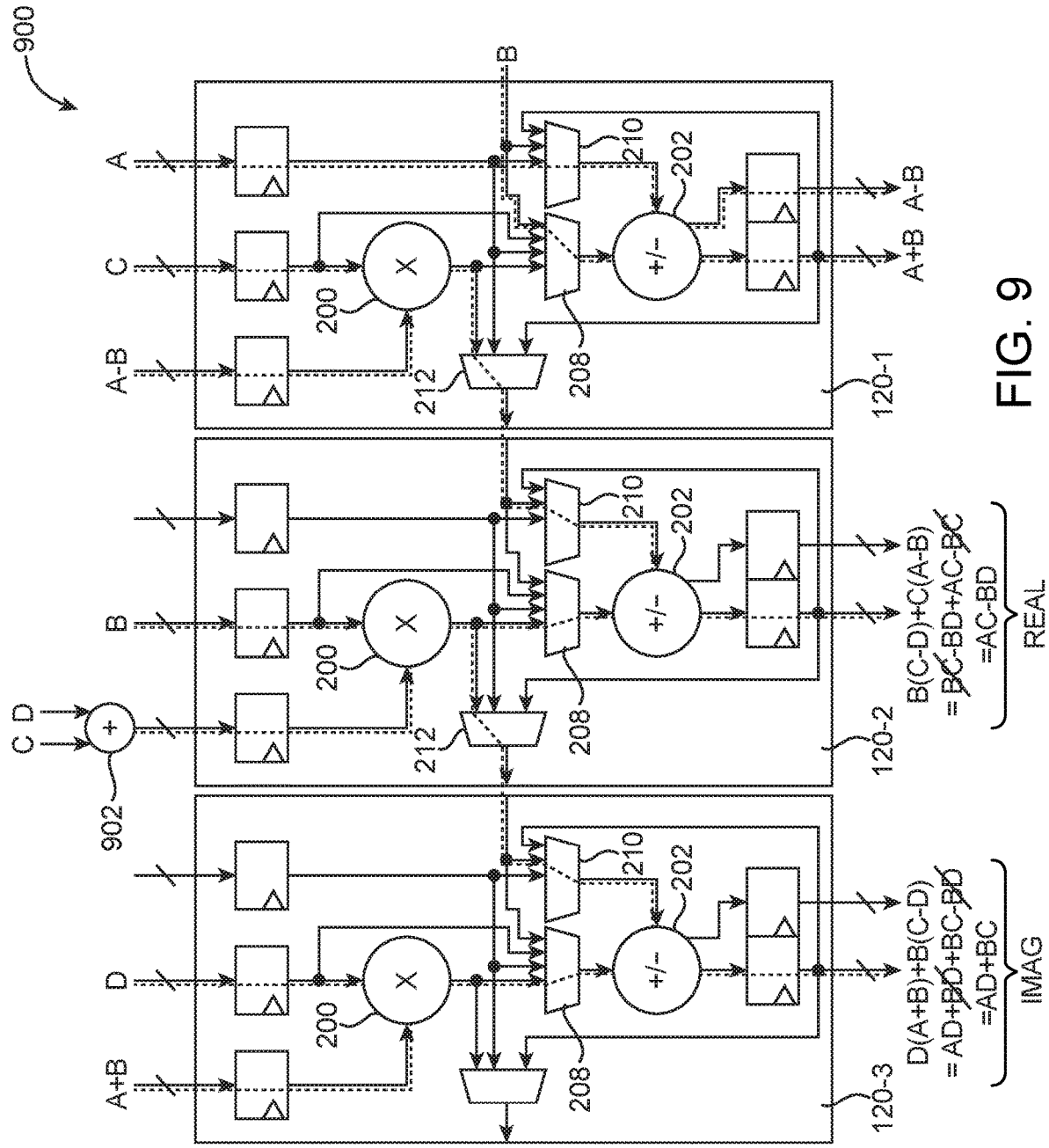

As shown in FIG. 9, complex multiplier circuitry 900 may include only three DSP blocks 120-1, 120-2, and 120-3 that are connected in a chain. Block 120-1 may receive signal A at its third input port and B at its fourth input port. Signal B may be received at the third input port of a preceding DSP block (not shown) and routed to DSP block 120-1 via path 211. For example, the third input port of DSP block 120-3 is unused and can be used to receive signal B for another set of three DSP blocks. Multiplexer 208 in block 120-1 may be configured to route signal B to the top input of adder 202 in block 120-1, whereas multiplexer 210 in block 120-1 may be configured to route signal A to the right input of adder 202 in block 120-1 (see shaded paths). Adder 202 of block 120-1 may then output a corresponding sum signal (A+B) and a corresponding difference signal (A−B).

The sum signal (A+B) generated at the first output port of block 120-1 may then be routed via external soft routing interconnection resources back to the first input port of block 120-3. The difference signal (A−B) generated at the second output port of block 120-1 may then be routed via external soft routing interconnection resources back to the first input port of block 120-1. Multiplier 200 of block 120-1 may receive difference value (A−B) and also signal C from its second input port and generate a corresponding product C*(A−B), which is then routed directly to the fourth input port of block 120-2 via multiplexer 212 of block 120-1.

Meanwhile, block 120-2 may receive a difference (C−D) from the output of adder 902 and also signal B at its second input port. Multiplier 200 of block 120-2 may receive these two inputs and compute a corresponding product B*(C−D), which may then be passed directly to the fourth input port of block 120-3 via multiplexer 212 of block 120-2. Multiplexer 208 in block 120-2 may be configured to simultaneously route product B*(C−D) to the top input of adder 202 in block 120-2, whereas multiplexer 210 in block 120-2 may be configured to route product C*(A−B) to the right input of adder 202 in block 120-2 (see dotted paths). Adder 202 of block 120-2 may then generate a sum value [B(C−D)+C(A−B)], which simplifies to (AC−BD)—the real portion of the desired output.

Referring now to block 120-3, block 120-3 may receive sum (A+B) from the first output port of block 120-1 and also D at its second input port. Multiplier 200 of block 120-3 may receive these two inputs and compute a corresponding product D*(A+B). Multiplexer 208 in block 120-3 may be configured to route product D*(A+B) to the top input of adder 202 in block 120-3, whereas multiplexer 210 in block 120-3 may be configured to route product B*(C−D) to the right input of adder 202 in block 120-3 (see dashed paths). Adder 202 of block 120-3 may then generate a sum value [D(A+B)+B(C−D)], which simplifies to (AD+BC)—the imaginary portion of the desired output.

Compared to the implementation of FIG. 8, the configuration of FIG. 9 employs only one external adder (i.e., one total external adders instead of three). The value (A+B) and (A−B) can be calculated by adder 202 in block 120-1, where the B input comes from the unused input of the rightmost block of the adjacent complex multiplier 900 to the right (not shown).

The exemplary FFT butterfly structures shown in FIGS. 3-6 and the complex multiply implementations shown in FIGS. 7-9 are merely illustrative and do not serve to limit the scope of the present embodiments. If desired, DSP block 120 of the type described in connection with FIG. 2 may be used to build other FFT elements of any suitable radix, to build complex multipliers using any type of decomposition algorithm, or to implement any other suitable type of complex arithmetic functions, etc.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA/INTEL Corporation.

The foregoing is merely illustrative of the principles of this invention and various modifications can be made by those skilled in the art. The foregoing embodiments may be implemented individually or in any combination.

What is claimed is:

1. An integrated circuit, comprising:
a first digital signal processing (DSP) block;
a second digital signal processing (DSP) block; and
a third digital signal processing (DSP) block, wherein the first, second, and third DSP blocks are coupled in a chain, wherein each of the first, second, and third DSP blocks comprises a multiplier circuit, an adder circuit, and a multiplexer circuit, and wherein the multiplier circuit in the first DSP block is configured to output a first signal that is selectively routed to the second DSP block via the multiplexer circuit in the first DSP block.

2. The integrated circuit of claim 1, further comprising:
a fourth digital signal processing (DSP) block coupled to the first, second, and third DSP blocks in the chain, wherein the fourth DSP also comprises a multiplier circuit, an adder circuit, and a multiplexer circuit.

3. The integrated circuit of claim 2, wherein the adder circuit in at least one of the four DSP blocks is configured to output a sum signal and a difference signal in parallel.

4. The integrated circuit of claim 1, wherein the multiplier circuit in the second DSP block is configured to output a second signal that is routed to the adder circuit in the second DSP block.

5. The integrated circuit of claim 2, wherein the first DSP block has an input port configured to receive a first signal that is routed to the adder circuit of the first DSP block.

6. The integrated circuit of claim 5, wherein the second DSP block has an input port configured to receive a second signal that is routed directly to the third DSP block.

7. The integrated circuit of claim 2, wherein the four DSP blocks are configured to receive complex input signals and to perform a radix-2 butterfly operation that outputs butterfly top real and imaginary signals and butterfly bottom real and imaginary signals, wherein the first DSP block generates the butterfly top imaginary signal, wherein the second DSP block generates the butterfly bottom imaginary signal, wherein the third DSP block generates the butterfly top real signal, and wherein the fourth DSP block generates the butterfly bottom real signal.

8. The integrated circuit of claim 7, wherein each multiplier circuit in the four DSP blocks is configured to receive a respective twiddle factor for the radix-2 butterfly operation.

9. The integrated circuit of claim 7, wherein the first DSP block is further configured to generate a first difference signal, and wherein the third DSP block is further configured to generate a second difference signal that is different than the first difference signal.

10. An integrated circuit, comprising:
a first digital signal processing (DSP) block;
a second digital signal processing (DSP) block;
a third digital signal processing (DSP) block; and
a fourth digital signal processing (DSP) block coupled to the first, second, and third DSP blocks in a chain, wherein each of the first, second, third, and fourth DSP blocks comprises a multiplier circuit and an adder circuit, and wherein the four DSP blocks are configured to receive first and second complex input signals and to implement a Karatsuba decomposition that generates a corresponding complex output signal, wherein the first DSP block outputs a first intermediate signal that is fed to the second DSP block, wherein the second DSP block outputs a second intermediate signal that is fed to the third DSP block, wherein the third DSP block outputs a real component of the complex output signal, and wherein the fourth DSP block outputs an imaginary component of the complex output signal.

11. The integrated circuit of claim 10, further comprising:
a first adder configured to output a first sum to the first DSP block.

12. The integrated circuit of claim 11, further comprising:
a second adder configured to output a second sum to the first DSP block.

13. An integrated circuit, comprising:
a first digital signal processing (DSP) block;
a second digital signal processing (DSP) block; and
a third digital signal processing (DSP) block, wherein each of the first, second, and third DSP blocks comprises a multiplier circuit and an adder circuit, wherein the first, second, and third DSP blocks are configured to receive sums generated from two complex inputs and to implement a Gaussian method that generates a corresponding complex output signal, wherein the first DSP block outputs a first intermediate signal that is fed to the second DSP block, wherein the second DSP block outputs an imaginary component of the complex output signal, and wherein the third DSP block outputs a real component of the complex output signal.

14. The integrated circuit of claim 13, further comprising:
a first adder external to the first DSP block that is configured to output a first of the sums to the first DSP block;
a second adder external to the second DSP block that is configured to output a second of the sums to the second DSP block; and
a third adder external to the third DSP block that is configured to output a third of the sums to the third DSP block.

15. The integrated circuit of claim 13, further comprising:
a circuit external to the first, second, and third DSP blocks that is configured to feed a difference signal into the second DSP block.

* * * * *